United States Patent [19]

Kaiser

[11] Patent Number: 5,230,904
[45] Date of Patent: Jul. 27, 1993

[54] APPARATUS FOR FULLY SUPPORTING APPLIANCE CABINET INTERIOR

[75] Inventor: Timothy M. Kaiser, Rice, Minn.

[73] Assignee: Komo Machine, Inc., Sauk Rapids, Minn.

[21] Appl. No.: 773,237

[22] Filed: Oct. 9, 1991

[51] Int. Cl.⁵ .............................................. B29C 39/26
[52] U.S. Cl. ........................... 425/4 R; 425/436 R; 249/152; 249/178; 249/205
[58] Field of Search ................. 425/4 R, 817 R, 453, 425/457, 436 R; 249/125, 176, 178, 205, 40, 27, 63, 152, 155, 180, 184, 187, 194, 1

[56] References Cited

U.S. PATENT DOCUMENTS

| | | | |
|---|---|---|---|
| 1,363,651 | 12/1920 | Hutchins | 249/152 |
| 3,801,059 | 4/1974 | Lippold | 249/134 |
| 3,811,646 | 5/1974 | Beasley | 249/180 |
| 3,822,853 | 7/1974 | Shelley | 249/27 |
| 3,877,856 | 4/1975 | Valentini | 425/817 R |
| 3,904,721 | 9/1975 | Puterbaugh | 264/46.5 |
| 4,252,291 | 2/1981 | Armas | 264/71 |
| 4,447,035 | 5/1984 | Ivey et al. | 249/194 |
| 4,519,570 | 5/1985 | Strickland et al. | 249/194 |
| 4,570,896 | 2/1986 | Strickland et al. | 249/180 |
| 4,614,326 | 9/1986 | Strickland et al. | 249/180 |
| 4,691,906 | 9/1987 | Zastrow | 269/48.1 |
| 4,751,032 | 6/1988 | Salamon et al. | 425/817 R |

*Primary Examiner*—Willard Hoag
*Attorney, Agent, or Firm*—Fitch, Even, Tabin & Flannery

[57] ABSTRACT

Disclosed is a collapsible plug which is insertable into the interior section of an appliance cabinet and expandable therein to simultaneously extend the plurality of panels to provide lateral shoring support to each of the interior surfaces of the cabinet so as to prevent bulging thereof during the injection and curing of insulating foam in the cavity between the interior surfaces and external surfaces of the cabinet, and collapsible so that the plug can be inserted into and removed from the cabinet interior without contacting the interior surfaces during insertion nor removal. Particularly, the disclosed design allows different thicknesses of tooling panels having surfaces complementary to the interior surface of the cabinet to be employed without concern for contact between adjacent panels upon their retraction due to the additional thickness.

22 Claims, 6 Drawing Sheets

APPARATUS FOR FULLY SUPPORTING APPLIANCE CABINET INTERIOR

BACKGROUND OF THE INVENTION

1. Field of the Invention

This invention relates to an apparatus and method for supporting the interior of appliance cabinets during molding, and more particularly to an apparatus and method for simultaneously supporting each of the interior walls of an appliance cabinet during the injection and curing of foam insulation between a cabinet inner wall and outer wall.

2. Description of Related Art

Many types of appliance cabinets, such as refrigerators and freezers, employ insulation surrounding the interior thereof to help maintain a desired internal temperature. Generally, such cabinets comprise a rear wall with depending side walls, wherein such walls have inner and outer surfaces with a small cavity therebetween. Insulating foam is injected into the cavity between the inner and outer surfaces of the rear and side walls.

Insulating foam is injected into the cabinet cavity under high pressure and expands during curing within the cabinet cavity. This pressure tends to cause bulging of the internal and external walls of the cabinet. Accordingly, it is known in the art to employ shoring panels adjacent the internal and external cabinet surfaces, during injection and curing, to prevent such bulging. Such an apparatus is disclosed in U.S. Pat. No. 3,801,059. During insulation injection and curing, shoring panels are secured flush against the interior and exterior cabinet surfaces so as to provide sufficient additional support strength to the cabinet surfaces to resist bulging. Upon completion of the curing process, the shoring panels are removed from the cabinet surfaces so that the insulated cabinet can be transported away and another cabinet brought into position for insulation injection utilizing the aforementioned shoring members.

It is also known to provide shoring apparatus, such as that disclosed in U.S. Pat. No. 3,801,059, that can be retracted away from the cabinet walls between insulations to accommodate removal and insertion of cabinets, and expanded during insulation injection and curing to provide shoring support to the cabinet walls. One major shortcoming of such designs is that only two interior side walls can be shored at one time. Thus, with such apparatus it is currently necessary to inject and cure only two side walls, remove the partially insulated cabinet from the apparatus, reinsert the cabinet in another apparatus, and inject and cure insulation in the two remaining side walls. It is desirable to employ a single apparatus capable of providing shoring support to all internal cabinet surfaces simultaneously, so that only a singular injection and curing step is necessary to insulate the entire cabinet cavity.

It is also known in the art to employ separate shoring apparatus to support the internal and external surfaces. An expandable plug or core is placed into the internal area of the cabinet to be insulated to provide support to the interior walls. However, current plug designs for simultaneously shoring all four depending side walls, such as the apparatus disclosed in U.S. Pat. No. 4,370,795, do not provide support at the corners whereat the depending side walls meet. Thus, a problem associated with current plugs is that they allow bulging at corner sections due to the foam injection pressure and expansion during curing within the cabinet cavity which, in combination with lack of shoring support in those regions, results in undesired deformation of the cabinet walls thereat.

Due to rising material costs, it is desirable to manufacture insulated appliance cabinets having cabinet walls as thin as possible with the least expensive material possible. However, concern for bulging at the corners associated with current designs imposes a significant limitation on insulation injection pressure and cabinet wall design parameters such as wall thickness and material selection. These limitations result in significantly increased manufacturing cost and time, due to the need to inject foam under relatively low pressure and the need to provide relatively thick cabinet walls. Accordingly, it is desirable to provide a plug to support the inside configuration of an appliance cabinet during the injection and curing of insulating foam which provides the requisite support of the entire cabinet interior, particularly at the corners.

It is also important that the plug be collapsible. Collapsibility of the plug is important in that it allows the cabinet to be removed after the insulation injection and curing without damaging any details present in the cabinet interior. That is, the shoring members of the plug are shaped to mate with the internal contour of the cabinet walls. After insulation, it is desirable to remove the shoring panels inward, away from the cabinet walls, so that the cabinet can be removed without tearing out or scraping any details present in the cabinet walls. With current designs, if the shoring panels are proportioned to be large enough to extend to the corners in their expanded position, then it is not possible to retract the panels away from the cabinet wall surfaces without the panels interfering with one another. Thus, it is desirable to provide a plug for supporting a cabinet interior during injection of insulating foam which reconciles the apparent mutually exclusive characteristics of both providing support at the corners when the panels are in an expanded position, and being retractable so that all the shoring panels are drawn away from the interior cabinet surfaces without interfering with or contacting one another.

Another shortcoming of current designs is that current apparatus require utilization of completely separate plugs for each size cabinet, or at least extensive tooling to change from shoring of the interior of one size or shape cabinet to a cabinet having a different size or shape. Also, current designs are limited to generally rectangular cabinets. It is desirable to provide a plug for shoring cabinet interiors which is flexible enough to accommodate cabinets having a wide variety of shapes and sizes with minimal retooling required between runs of different cabinets.

Furthermore, it is desirable to provide such a plug which is capable of automated operation, thereby allowing large scale assembly line type production.

STATEMENT OF THE INVENTION

In accordance with the present invention, a collapsible plug is provided for supporting the interior of an appliance cabinet during the injection of insulating foam therein which provides complete shoring of the internal surfaces of the cabinet. Particularly, apparatus constructed in accordance with the present invention provide heretofore unattainable support at the interior corner sections of appliance cabinets during injection and curing of insulating foam, while also providing for retractability of the shoring panels away from the interior cabinet surfaces without interfering with one another.

The apparatus comprises a plug having retractile shoring panels such that, during injection and curing, the shoring panels are extended to abut virtually the entire cabinet interior including the corners; and, after injection, the shoring panels are drawn away from the interior surfaces of the cabinet to clear any details which may be present during removal of the cabinet. The retractile shoring members are provided with simple means for interchanging tooling panels thereon in order to accommodate more than one size and shape of cabinet interior. That is, a plurality of separate tooling panels are maintained so that for any particular application an appropriate tooling panel, having a surface complementary to the interior configuration of the cabinet to be insulated, is mounted on the shoring members.

Retractable plugs used for insulation of refrigerators, freezers, and the like are large devices which are expensive to manufacture and maintain. Significant savings are attained by the flexibility of apparatus constructed according to the present invention, wherein the same plug can be employed to support a wide range of cabinet interiors.

The shoring members are configured so that they define a substantially continuous external surface during insulating when the panels are extended. This assures total support of the entire cabinet interior surface during insulation injection and curing. Thereafter, the panels are retracted in a predetermined sequence prior to removal of the plug such that the panels retract without contacting one another and do not scratch the cabinet interior upon removal of the plug.

A particular advantage of apparatus constructed in accordance with the present invention is that tooling panels having significantly different thicknesses are mountable upon the retractile panels and the additional thickness to the tooling panels does not preclude interference-free retraction of the panels, as is the case with other designs. Accordingly, variations on the order of several inches in both width and length are attainable with a standard size refrigerator cabinet plug, by simply mounting thicker tooling panels thereupon, without concern for interference between the panels upon retraction.

BRIEF DESCRIPTION OF THE DRAWINGS

In the drawings, wherein like elements are referenced alike.

DETAILED DESCRIPTION OF THE PREFERRED EMBODIMENT

FIGS. 1–5 show preferred embodiments of a plug or male mold used to support the inside configuration of an appliance cabinet during injection and curing of insulating foam between the inside and outside walls of the cabinet. While the invention is described with regard to employment of such plugs for the shoring of cabinet walls during insulation injections, it is appreciated that other uses, such as utilization as a male portion of a mold, will be readily apparent to those skilled in the art.

Figure 1:
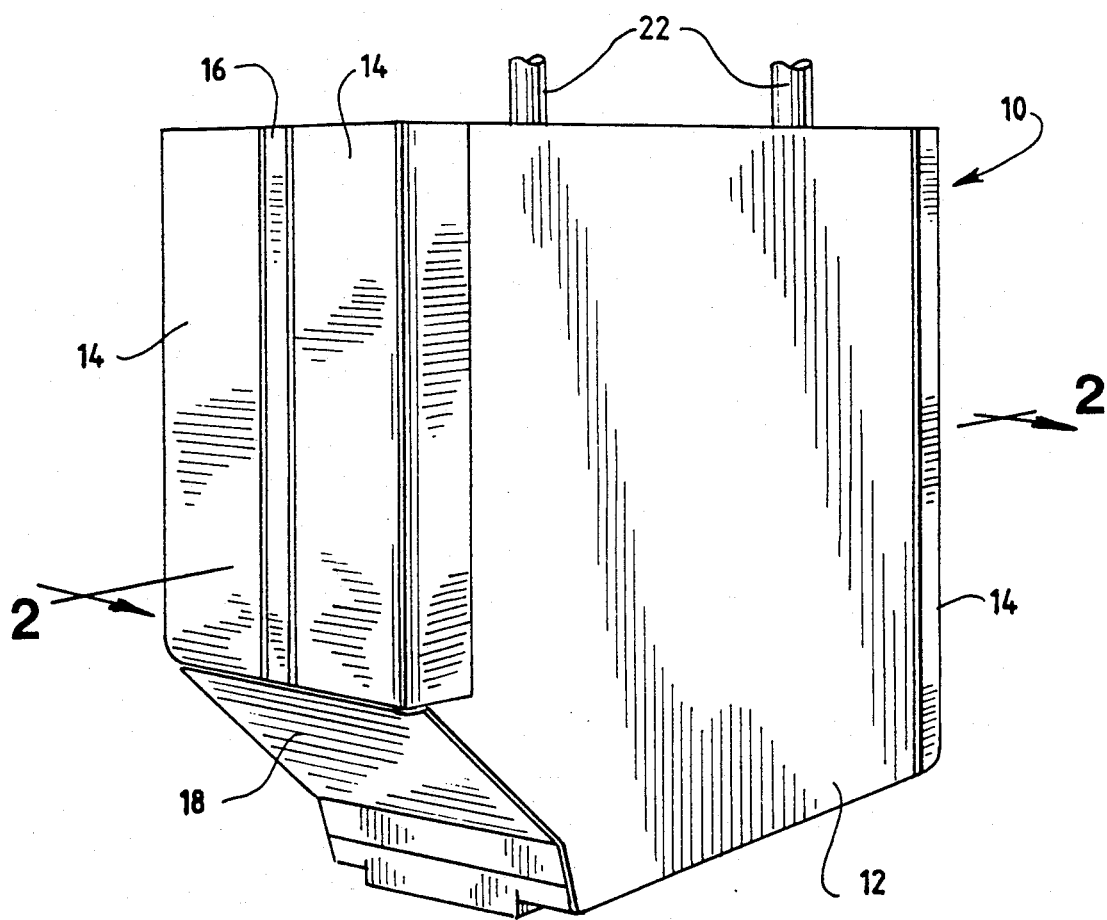
FIG. 1 is a perspective view of a plug embodying various features of the present invention.

With initial reference to FIG. 1, the plug indicated generally at 10 is illustrated to show one arrangement of apparatus for carrying out the present invention. In this embodiment, side tooling panels 12, corner tooling panels 14, and center tooling panels 16 are retracted and extended while bottom tooling panel 18 remains stationary. The plug is proportioned so that the outer surfaces of the tooling panels in their extended positions define a generally continuous outer plug surface which is complementary to the interior surface of the cabinet to be supported.

The corner tooling panels 14 of the present invention are extended and retracted by sliding in the transverse direction first and then retracting inwardly normal to the plane of the panels in contrast with copending application "Apparatus and Method for Supporting a Cabinet During Foam Injection" wherein the corner tooling panels 14 are extended and retracted at an angle in a substantially rectilinear direction. Also, in accordance with the present invention, the linkages extending to the corner tooling panels 14 to actuate the corner panels are not connected to a common translating member with the other tooling panels 12 and 16 as is done in the aforementioned co-pending application, which allows the corner tooling panels 14 to be moved transversely other than simultaneously with the other tooling panels 16 and 18. This arrangement allows tooling panels of a wide range of thicknesses to be selectively employed without interference between adjacent panels upon retraction as will be described in detail below.

The plug 10 depends from two vertical support rods 22 by which the plug 10 is supported. Upon registration of a cabinet beneath the plug 10, the cabinet is lifted until the plug 10 is completely inserted into the interior section of the cabinet to be insulated. Thereafter, the plug 10 is expanded within the cabinet interior to support the inner walls of the cabinet, as described below, and the plug is maintained in its expanded position supporting the inner walls until completion of the insulation injection and curing operations. In their expanded positions, the outer surfaces of the tooling panels form a generally continuous surface and there may be only approximately 0.1 inch gaps between adjacent panels, which gaps are sufficiently narrow to preclude bulging of the inner walls at these gaps.

The tooling panels of plug 10 are then drawn in, away from the cabinet inner walls, after which the cabinet is lowered to remove the plug 10 from the cabinet interior. The cabinets may be raised and lowered either manually or in an automated process employing a feedback and control type system between the mechanism which raises and lowers the cabinets and a cabinet advancement mechanism which advances the cabinets into and out of registration beneath the plug 10. Accordingly, the plug 10 provides support to the entire interior surface of cabinets which are successively passed therebeneath. Alternatively, the plug 10 may be with the plurality of appliance cabinets sequentially elevated into registration therewith. Thus, the plug 10 generally comprises a plurality of tooling panels which are sequentially extended to support virtually the entire interior surface of the cabinet during insulation, and retracted away from the cabinet interior surface for removal of the plug 10 without damaging any details which may be present on the interior surface of the cabinet. Tooling or shoring panels or plates 12, 14, 16 and 18 are mounted on respective subpanels 12a, 14a, 16a and 18a, wherein the subpanels are permanent components of the plug 10 which are extended and retracted by connecting rod linkages of the plug, as described below, to extend and retract the tooling panels mounted thereon.

Tooling or shoring panels 12, 14, 16 and 18 having different thicknesses and surface contours are interchangeable upon their respective subpanels 12a, 14a, 16a and 18a as desired to suit a given application. Interchangeability of tooling panels provides flexibility to allow plugs 10 constructed in accordance with the present invention to be utilized to provide shoring support to cabinets having a wide variety of shapes and sizes without the extensive tooling which would otherwise be required. For instance, the interior surface of a refrigerator cabinet may be provided with detail, such as protrusions on opposing sides thereof to support shelves therein. A tooling panel having complementary detail, such as recesses to accommodate the protrusions, will be mounted on the subpanel for that particular application so as to prevent damage to the protrusion upon shoring which would otherwise occur with a completely flat or non-complementary shoring panel.

Similarly, refrigerator cabinets having different widths and heights may require interior support during insulation. Tooling panels having greater or lesser thicknesses can be mounted on the subpanels to, respectively, support larger or smaller cabinets without the need to utilize separate plugs for each different size.

Thus, as the subpanels 12a, 14a and 16a are extended and retracted, the tooling panels 12, 14 and 16 mounted thereto are also extended and retracted. The tooling panels 12, 14, 16 and 18 may be provided with cooling means known in the art, such as fluid circulation therethrough, to increase the cooling rate of the injected insulation and thereby allow for increased production speeds. This is particularly important in light of the recent restrictions placed on chlorofluorocarbon (C.F.C) emissions and the high exothermic temperatures generated by low chlorofluorocarbon insulating foams.

Figure 6:
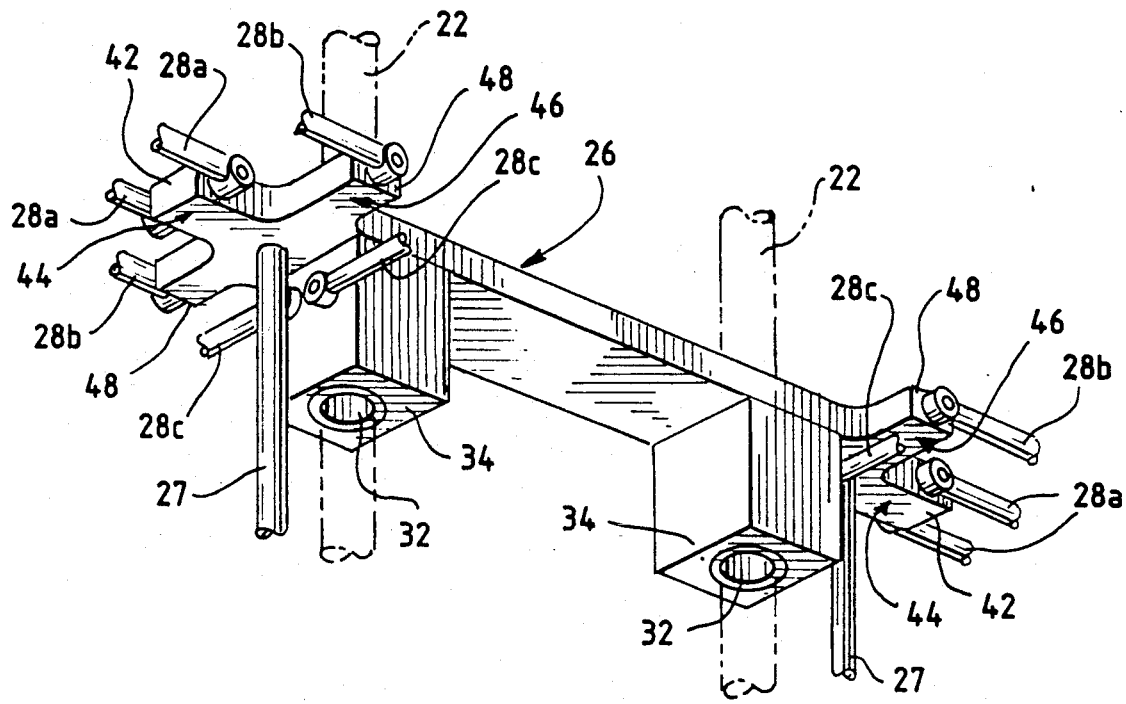
FIG. 6 is an enlarged perspective view from below of the actuator plate portion of the plug illustrated in FIGS. 1 through 5.

Retraction and extension of the subpanels 12a, 14a, and 16a and, accordingly, the tooling panels 12, 14 and 16, is accomplished by translating the two actuator plates which are indicated by the general reference character 26 vertically. The actuator plates comprise an upper actuator plate 26a and a lower actuator plate 26b. Each of the retractile subpanels 12a, 14a and 16a are pivotally connected to both actuator plates 26a and 26b through connecting rods, which are identified by a general reference character 28. Illustrated in FIG. 6 is one embodiment of an actuator plate, shown with the connecting rods 28 pivotally attached thereto. It is important that the relative rate of advancement of the panels with respect to one another be closely controlled during translation of the panels to prevent the panels from contacting and interfering with one another in their path of travel. By providing for different length connecting rods 28 between the actuator plates 26 and the respective retractile subpanels, each of the subpanels may be extended and retracted at a faster or slower rate with respect to the other subpanels. That is, subpanels connected to the actuator plates through shorter connecting rods 28 extend and retract more rapidly than those subpanels connected to the actuator plate through longer connecting rods. This relationship may be understood by comparing an infinitely long connecting rod and a one-inch connecting rod. With the former, a one-inch movement of the actuating plate would produce no movement in the attached panel, while with the latter, it would produce a one-inch movement. In the illustrated embodiment, the connecting rods 28 include turnbuckles 29 or like elements wherein the length of the connecting rods may be varied as required.

Figure 2:
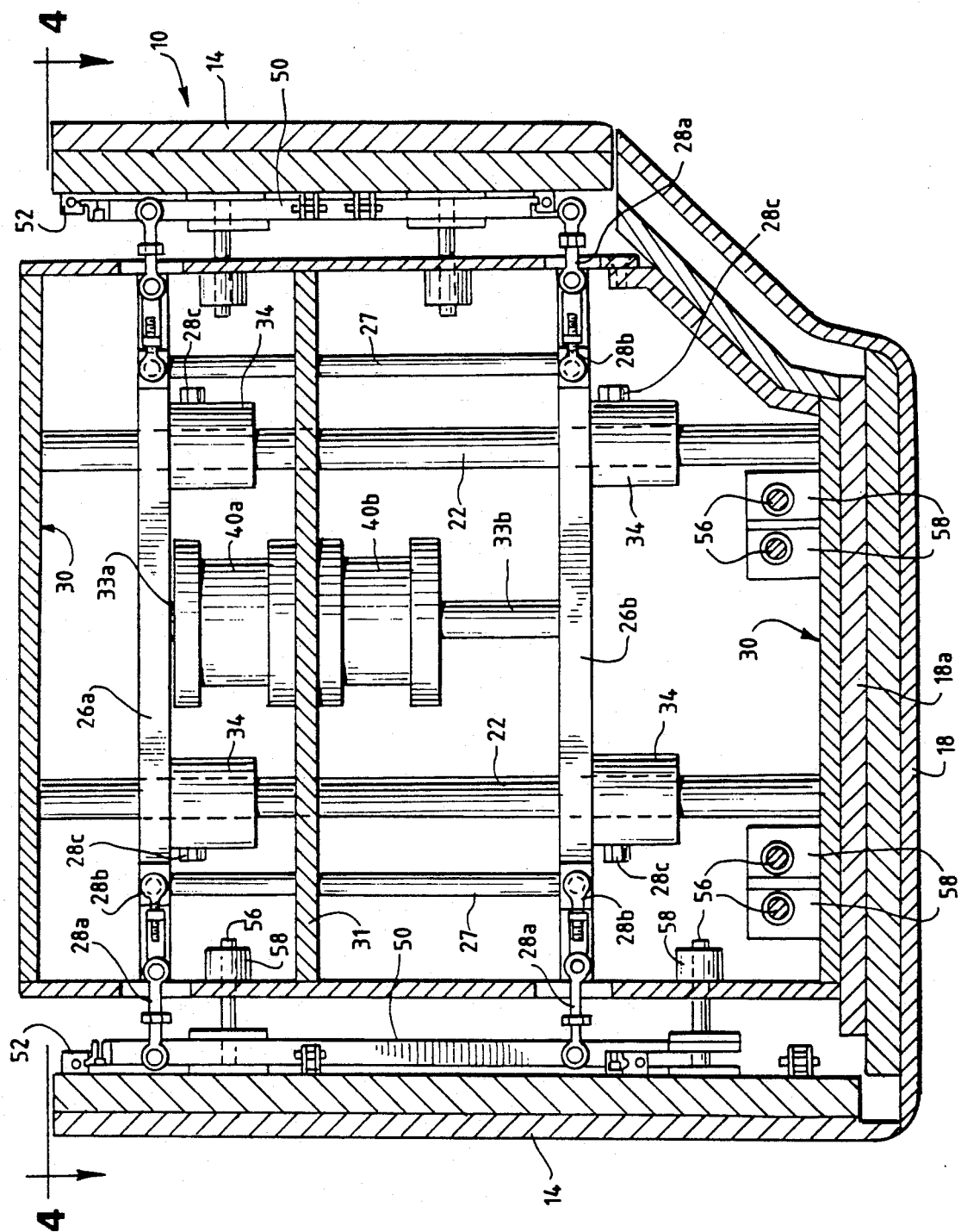
FIG. 2 is an enlarged sectional view of the plug illustrated in FIG. 1 taken along line 2—2 of FIG. 1 with the plug shown in its expanded position.

After a cabinet to be insulated has been brought into registration beneath the plug 10, the cabinet to be insulated is elevated to effect insertion of the plug into the cabinet interior. The cabinet is elevated until the bottom tooling panel 18, which is mounted to the bottom subpanel 18a, abuts the bottom wall of the cabinet interior. As best seen in FIG. 2, a frame 30 is provided which is integral with the bottom subpanel 18a. As is evident from FIG. 2, the frame 30 is of rectangular configuration having top and bottom parallel walls and spaced parallel side walls. The frame 30, bottom subpanel 18a, and vertical support rods 22 are interconnected. The frame 30 serves to support the actuator plates 26a and 26b, which operate through connecting rods 28 to effect extension and retraction of the tooling panels 12, 14 and 16 upon vertical translation of the actuator plates 26a and 26b, as mentioned above and described below.

Figure 3:
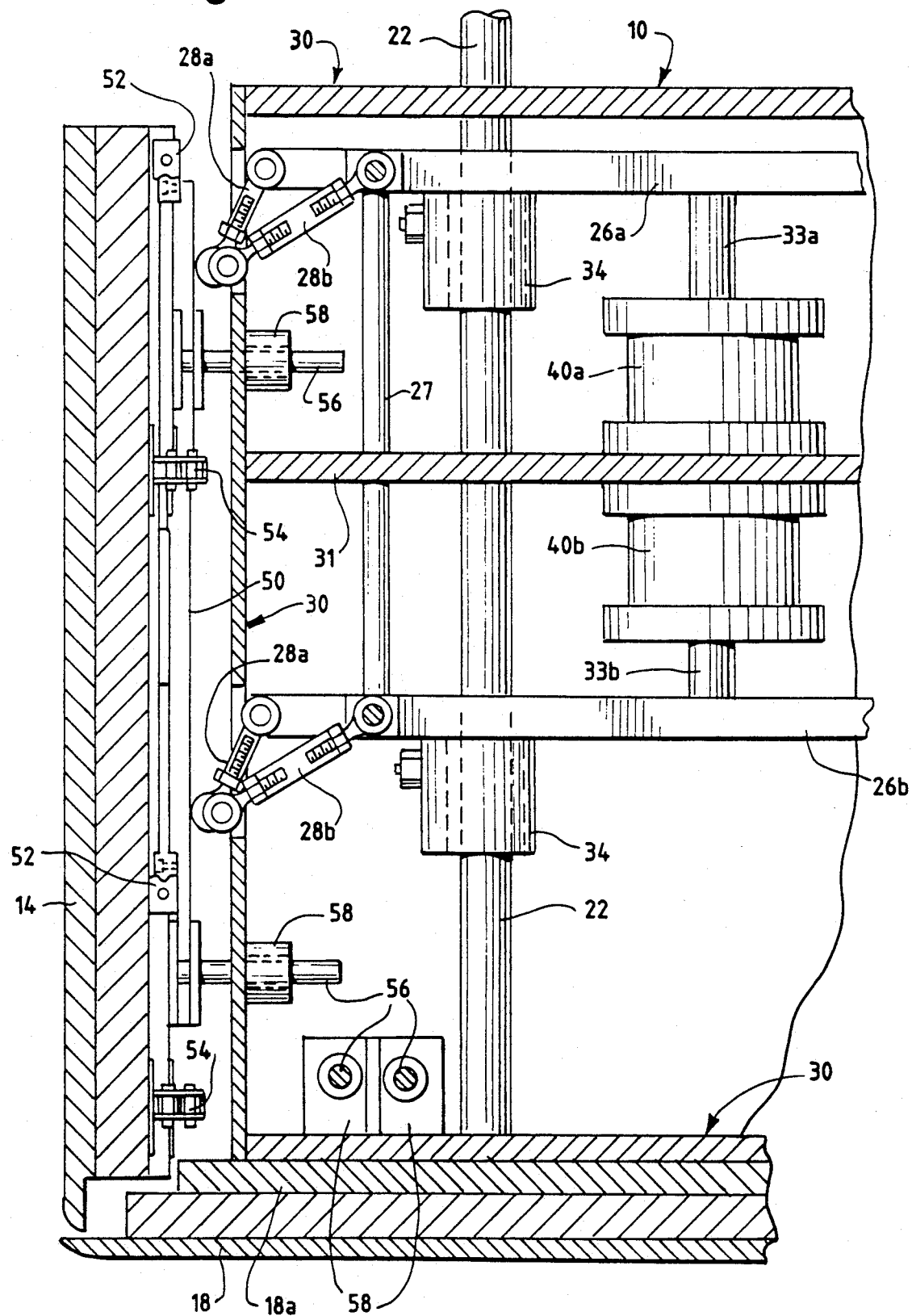
FIG. 3 is an enlarged fragmentary sectional view of the plug taken along line 2—2 of FIG. 1 with the plug shown in its collapsed position.
Figure 5:
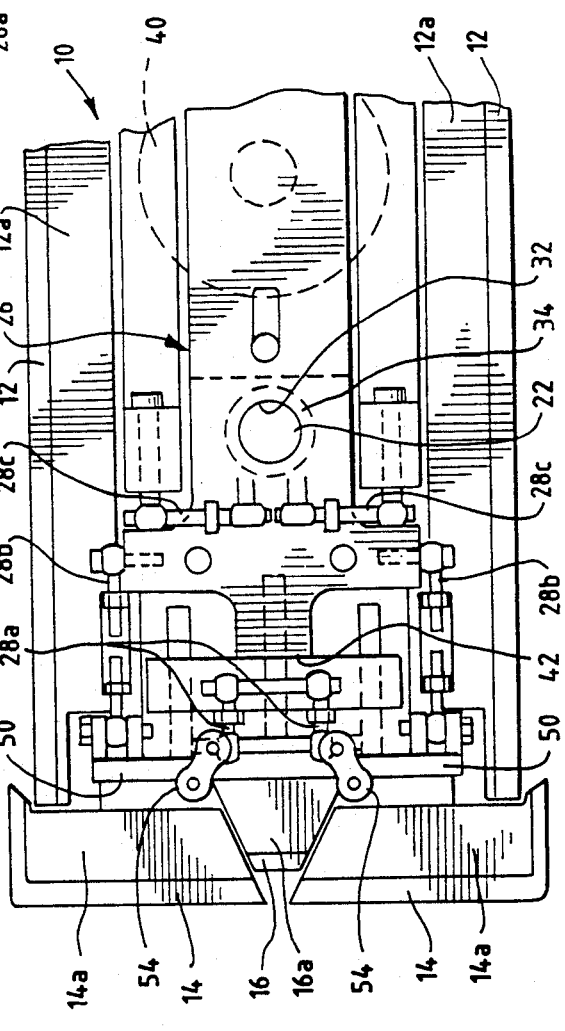
FIG. 5 is an enlarged fragmentary sectional view of the plug taken along line 4—4 of FIG. 2, similar to FIG. 4, but with the plug shown in its retracted position.

During elevation of the cabinet to be insulated in order to bring the plug 10 within the cabinet interior section to be insulated, the plug 10 is in its collapsed position as shown in FIGS. 3 and 5. In its collapsed position, the plug 10 is insertable into the cabinet interior without any of the side tooling panels 12, corner tooling panels 14, or center tooling panels 16 contacting the side surfaces of the cabinet interior during insertion. This prevents damage to any details which may be present on the interior side surfaces of the cabinet. After the plug 10 has been brought fully into the cabinet interior, with the bottom tooling panel 18 abutting the bottom wall of the cabinet interior, the side subpanels 12a, corner subpanels 14a and center subpanels 16a, with their respective side tooling panels 12, corner tooling panels 14 and center tooling panels 16 mounted thereto, are sequentially extended, as described below, so that the tooling panels abut and support the entire cabinet interior, including the sides and corner sections of the cabinet interior, throughout the injection and curing of insulating foam.

With continued reference to FIGS. 2 and 3, it is seen that each of the side subpanels 12a, corner subpanels 14a and center subpanels 16a are connected to both the upper and lower horizontal actuating plates 26a and 26b through the connecting rod linkage arrangement shown in the drawings. This connecting rod linkage configuration allows the plug 10 to attain the tucked-in or collapsed position seen in FIGS. 3 and 5 when the actuator plates 26a and 26b are raised, and to attain the expanded position seen in FIGS. 1, 2 and 4 when the actuator plates 26a and 26b are lowered. The requisite vertical translation of the actuator plates 26a and 26b is effected by employment of pneumatic cylinders 40 as shown in FIGS. 2 and 3 and described further below.

The horizontal actuator plates 26a and 26b are both provided with two rod receiving apertures 32 therein for receiving the two vertical support rods 22 therethrough. Actuator plate linear bearing blocks 34 are fixedly mounted on the actuator plates and are provided at the apertures 32 in both the upper and lower actuator plates 26a and 26b to maintain the horizontal orientation of the actuator plates 26a and 26b upon vertical translation thereof. That is, the actuator plates 26a and 26b are slidable up and down along the vertical support rods 22, guided in their vertical translation by the actuator plate linear bearing blocks 34. The support rods 22, having the lower ends thereof rigidly secured to subpanel 18a and frame 30, maintain the plug 10 in a stationary position with cabinets being elevated to bring plug 10 within the cabinet until the bottom tooling panel 18 of the plug 10 is flush against the bottom surface of the cabinet interior. The pneumatic cylinder is then actuated to lower the actuator plates 26a and 26b, thereby extending the tooling panels. That is, after the cabinet has been elevated to bring the plug 10 into the cabinet interior in its collapsed position, the support rods 22 maintain the frame 30 and bottom subpanel 18a in a stationary position as the actuator plates 26a and 26b are translated vertically downward along the length of the support rods 22, to extend the tooling panels 12, 14 and 16.

Figure 4:
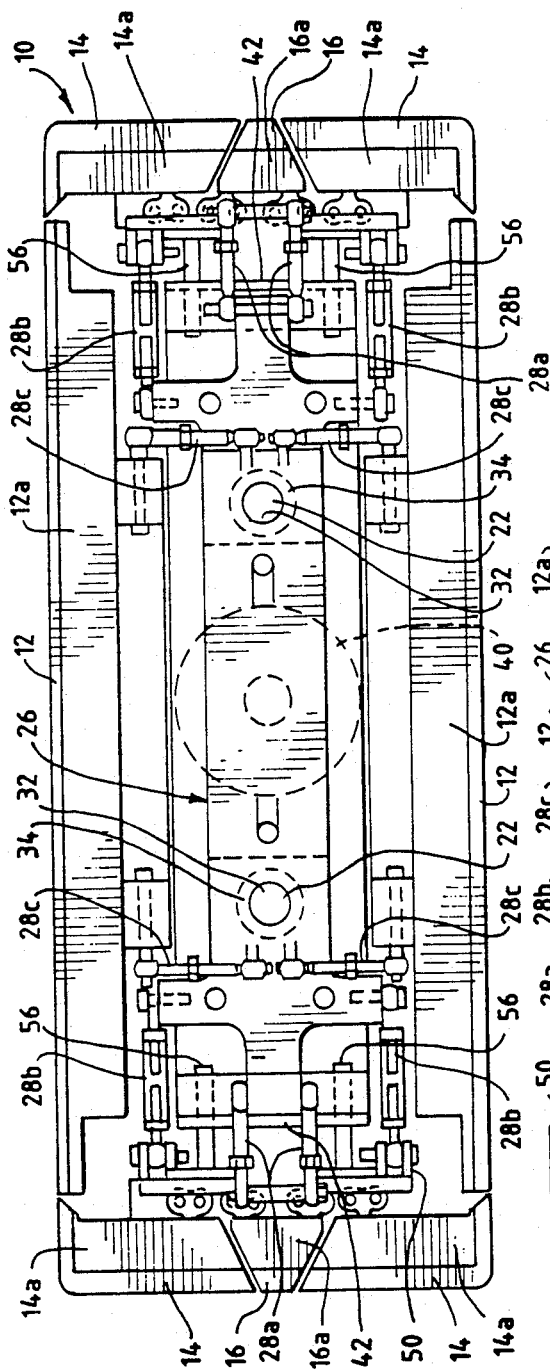
FIG. 4 is an enlarged sectional view of the plug taken along line 4—4 of FIG. 2 with the plug shown in its expanded position.

As best seen in FIGS. 4 and 6, the actuator plates 26a and 26b are of different widths at the ends thereof to facilitate the mounting of different lengths of connecting rods between the actuator plates 26a and 26b and the plurality of panels. The opposite ends 42 of the actuator plates 26a and 26b are generally T-shaped, having narrow end portions 44 and transversely extending portions 46.

Figure 7:
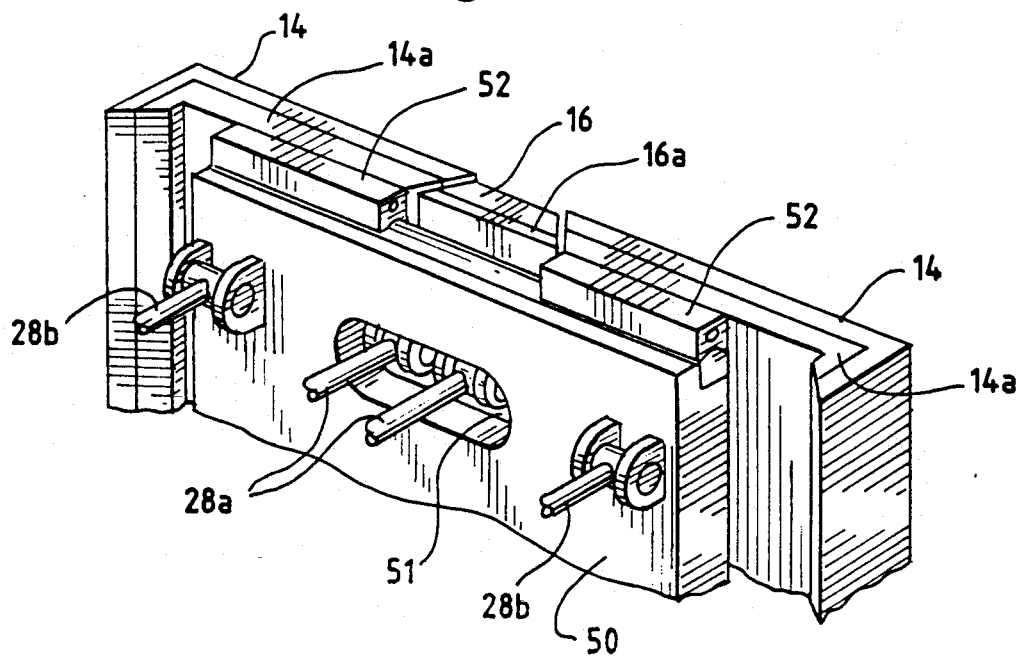
FIG. 7 is an enlarged perspective view of the corner panel support frame portion of the plug illustrated in FIGS. 1 through 6.

The two narrow end portions 44 of both the upper 26a and lower 26b actuator plates each have two center panel connecting rods 28a pivotally connected thereat, which connecting rods 28a are pivotally connected at their other ends to the center subpanels 16a. As seen in FIG. 7, the center panel connecting rods 28a extend through an aperture 51 provided in the corner panel support frame 50. A similar aperture 51 is provided at the lower end of the corner panel support frame 50 through which center panel connecting rods 28a pass. The transversely extending portions 46 of the actuator plates 26a and 26b each have corner panel connecting rods 28b pivotally connected at the opposing ends 48 thereof, which connecting rods 28b are pivotally connected at their other ends to the corner panel support frame 50, upon which the corner tooling panels 14 are mounted, to effect lateral translation of the corner tooling panels 14. Transverse translation of the corner tooling panels 14 is effected by sliding of the corner panels 14 upon the corner panel support frame 50, as will be explained in greater detail below.

Additionally, the four actuator plate linear bearing blocks 34 each have two side panel connecting rods 28c pivotally connected thereto, which connecting rods 28c are pivotally connected at their other ends to the side subpanel 12a. With the aforementioned connecting rod linkages between the actuator plates 26a and 26b and each of the subpanels, vertical translation of the actuator plates 26a and 26b results in the simultaneous retraction and extension of each of the subpanels, and accordingly, each of the tooling panels.

In order to allow for the collapsed plug position shown in FIG. 5, the connecting rods 28a and 28c extending, respectively, between the actuator plates 26a and 26b and the center subpanels 16a and side subpanels 12a are shorter than the connecting rods 28b extending between the actuator plates 26a and 26b and the corner panel support frame 50 which supports the corner tooling panels 14. As discussed above, the center tooling panels 16 and side tooling panels 12 will, accordingly, retract and extend rapidly in relation to the lateral retraction and extension of the corner tooling panels 14, as is required to prevent contact between adjacent panels during their translation.

The preferred arrangement, shown in the drawings and described herein, precludes the need to provide separate actuators to effect movement of the separate panels, thereby minimizing both the initial cost and the number of components which may wear and need replacement in the future. Alternative actuating arrangements for retracting the tooling panels 12, 14, and 16 will be readily apparent to those skilled in the art. For instance, a plurality of actuators may be employed wherein separate actuators extend to each of the tooling panels.

More specifically, in the preferred embodiment as shown in FIG. 7, the corner tooling panels 14 are mounted on respective corner subframes 14a which are in turn slidably mounted on corner panel support frames 50. As best seen in FIG. 4, four corner panel connecting rods 28b are pivotally connected to both of the corner panel support frames 50; two connecting rods 28b extending from the upper actuator plate 26a to the upper portion of each of the corner panel support frames 50, and two connecting rods 28b extending from the lower actuator plate 26b to the lower portion of each of the corner panel support frames 50. As discussed above, this connecting rod linkage arrangement provides the desired lateral expansion and retraction movements of the corner tooling panels 14, which are mounted on the corner panel support frame 50, upon vertical translation of the actuator plates 26a and 26b. That is, the two corner tooling panels 14 on one lateral side of the plug 10 are mounted on a common corner panel support frame 50, and the two corner tooling panels 14 on the opposing lateral side of the plug 10 are mounted on a separate, common corner panel support frame 50. Thus, retraction and extension of either one of the corner panel support frames 50 will cause lateral retraction and extension of the two corner tooling panels 14 mounted thereto.

Furthermore, as seen in FIG. 7, the corner panel support frames 50 include upper and lower linear bearings 52 which are mounted on the corner subpanels 14a and which engage the upper and lower edges of the frames 50. Thus, the bearings 52 permit the corner tooling subpanels 14a to slide transversely upon the corner panel support frames 50. This is desirable so that the corner tooling panels 14 can be retracted and extended in the transverse direction independent of the lateral movement. That is, the aforementioned connecting rod linkage arrangement between the actuator plates 26a and 26b and the corner panel support frames 50 by the connecting rods 28b provides for lateral extension and retraction of the corner panel support frames 50, and therefore the corner tooling panels 14 mounted thereon. At the same time, the linear bearings 52 provide for transverse extension and retraction of the corner tooling panels 14 by low friction sliding in the transverse direction.

The extension and retraction transverse sliding movements of the corner tooling panels 14 upon the corner panel support frame 50 are effected by links 54 interconnecting the center subpanels 16a with the respective corner subpanels 14a on either side thereof. The links 54 are disposed for movement in horizontal planes and are pivotally secured to the center subpanels 16a and the corner subpanels 14a for rotation about vertical axes. Thus, upon retraction of the center subpanels 16a, the two corner subpanels 14a linked thereto slide on the linear bearings 52 toward one another, under the influence of the links 54, allowing for the tucked-in arrangement shown in FIG. 5. Similarly, upon extension of the center subpanels 16a, the two corner subpanels 14a linked thereto slide on the linear bearings 52 away from one another, under the influence of the links 54, allowing for the generally continuous outer surface shown in FIG. 4.

The two center subpanels 16a, four corner subpanels 14a, and two side subpanels 12a have linear guide rods 56 at both their upper and lower ends which depend inwardly from the respective subpanels and are received in frame linear bearing blocks 58 which are provided on the frame 30 to provide support to the panels and to assure accurate linear extension and retraction movement of the subpanels.

As seen in FIGS. 2 and 3, the linear guide rods 56 and frame linear bearing blocks 58 of the opposing side tooling panels 12 are offset with respect to one another so that upon retraction of the two side tooling panels 12 the linear guide rods 56 extending from the side panels do not abut one another, as may otherwise occur with plugs 10 having a narrow transverse width.

As is evident from the foregoing, the corner tooling panels 14 are mounted for movement in the plane of center tooling panels 16 by the support frame 50 and bearing 52, and also for movement normal to the plane of the tooling panels 16 by the movement caused by the connecting rods 28b and the actuator plates 26a and 26b. Although the corner tooling panels must be retracted and extended both transversely and laterally, it is advantageous to have the mounting such that these motions in the transverse and lateral directions may be accomplished independently of each other so that the sequencing of the movement of the corner tooling panels may best avoid interference with adjacent panels. If the corner panels move on a rectilinear path, the problem of interference with adjacent panels is much more significant and greater limits are placed on the flexibility of changing the tooling panels.

The approach followed in the disclosed preferred embodiment is to slide the corner panels laterally toward each other at each end of the plug, thus allowing the side panels to move inwardly quickly without interference. As this inward sliding movement of the corner panels is largely completed, connecting rods 28b are then moving the corner panels inwardly in the transverse direction normal to the plane of the initial sliding movement. Any point on the corner panel moves in a curvilinear path in moving from the position shown in FIG. 4 to the retracted position shown in FIG. 5. This type of motion of the corner panels is achieved by the action of the links 54 in drawing in the corner panels as the center panels are retracted and then the delayed action of the connecting rods 28b in retracting the frame 50 in the transverse direction, or normal to the direction of initial sliding movement.

Figure 8:
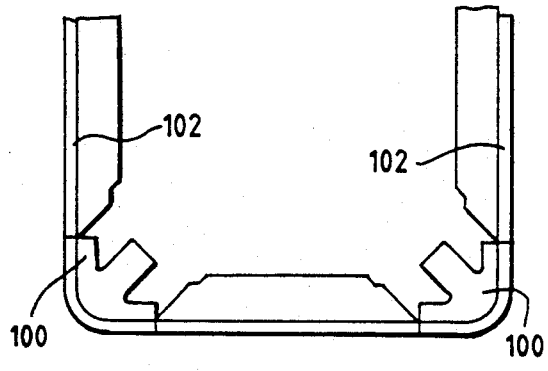
FIG. 8 is a schematic plan view of a prior art support plug shown in its fully extended position.
Figure 11:
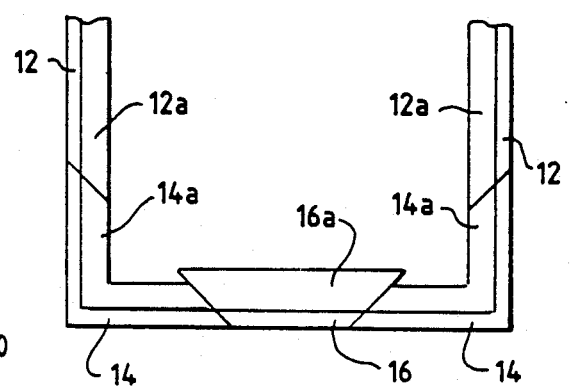
FIG. 11 is a schematic plan view of the support plug of FIG. 1 shown in its fully extended position.
Figure 9:
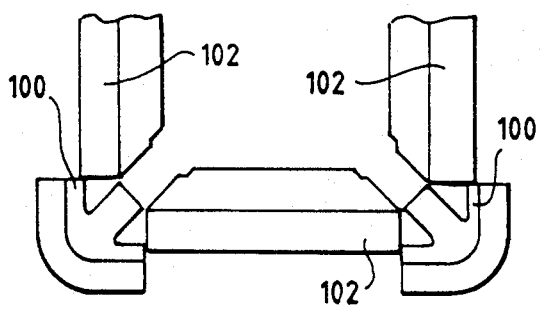
FIG. 9 is a schematic plan view of the prior art support plug of FIG. 8 shown in its intermediate position.
Figure 12:
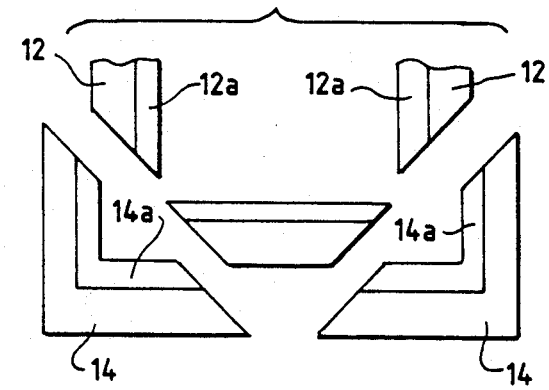
FIG. 12 is a schematic plan view of the support plug of FIG. 1 shown in its intermediate position.
Figure 10:
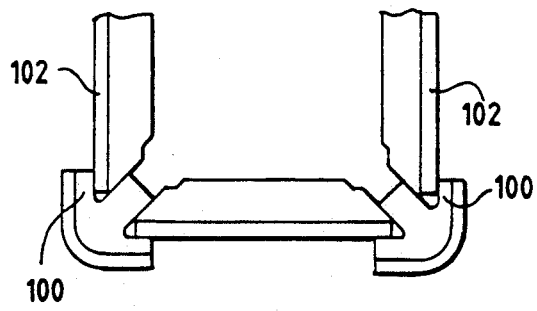
FIG. 10 is a schematic plan view of the prior art support plug of FIG. 8 shown in its fully retracted position.
Figure 13:
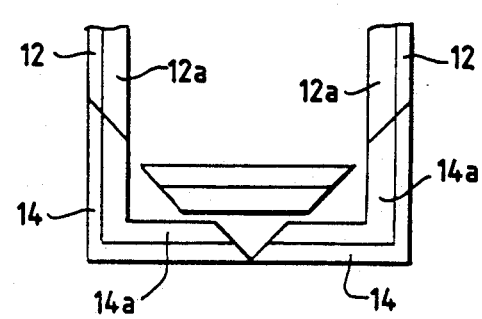
FIG. 13 is a schematic plan view of the support plug of FIG. 1 shown in its fully retracted position.

The aforementioned advantage attained by the present invention over the design of the co-pending application entitled "Apparatus and Method for Supporting a Cabinet During Foam Injection", that is, of being able to interchange tooling panels of varying thickness without interference between adjacent panels upon retraction, is illustrated in a comparison of FIGS. 8-10 with FIGS. 11-13. FIGS. 8-10 illustrate the sequence of panel movements between their extended and retracted positions as undergone with apparatus constructed in accordance with the aforementioned co-pending application. FIGS. 11-13 illustrate the sequence of panel movements between their extended and retracted positions as undergone with apparatus constructed in accordance with the present invention.

In their fully extended positions, as seen in FIGS. 8 and 11, variations in the thickness of the tooling panels mounted on the subpanels does not affect the functionality of the apparatus. However, with reference to the intermediate position attained during retraction shown in FIGS. 9 and 12, it can be seen that increased thickness of the tooling panels 12, 14, 16 and 18 does create problems with interference between adjacent panels upon their retraction with apparatus constructed in accordance with the aforementioned copending application. Particularly, as seen in FIG. 9, a significant increase in the thickness of the tooling panels causes the corner subpanels 100 of the co-pending application to abut the side tooling panels 102 during retraction. This precludes the corner subpanel 100 from attaining the desired tucked-in position illustrated in FIG. 10 which is attained with employment of thinner tooling panels.

Contrarily, as seen in comparing the sequential movement of the panels of apparatus constructed in accordance with the present invention, as shown in FIGS. 11-13, it is seen that significant increases in the thickness of the side tooling panels 12 and the center tooling panels 16 are possible without causing interference between the adjacent panels upon retraction. That is, since the corner subpanels 14a of apparatus constructed in accordance with the present invention do not require attainment of the tucked-in position shown in FIG. 10, as is required with plugs of the aforementioned co-pending application, variations in the thickness of the tooling panels 12, 14, 16 and 18 of apparatus of the present invention will not cause contact between adjacent panels upon their retraction. Since the corner tooling panels 14 are not drawn inward in the lateral direction until the center tooling panels 16 have retracted, interference between the tooling panels upon retraction is eliminated. Thus, apparatus of the present invention allow for greater flexibility in varying the external size and shape of the support cores.

It is desirable to proportion the connecting rods 28a, 28b and 28c so that the connecting rods are horizontal upon abutment of the tooling panels 12, 14 and 16 against the cabinet interior surfaces. This is desirable so that any forces associated with bulging of the inner wall of the cabinet interior are imparted horizontally to the actuator plates 26a and 28b. Thus, the downward vertical translation of the actuator plates 26a and 28b is terminated upon the connecting rods attaining a horizontal orientation, with the side 12, center 16, and corner 14 tooling panels in their fully extended positions abutting the cabinet interior surfaces. The horizontal position of the connecting rods 28a, 28b and 28c provides optimal strength in resisting inward movement of the tooling panels and, thus, optimal strength in resisting bulging of the inner walls of the cabinet during insulating. With the connecting rods generally horizontal, any force from the inner walls of the cabinet imparted to the actuator plates 26a and 26b is generally horizontal, and therefore the vertical force imparted to the actuator plates 26 is minimized. This eliminates the need for costly additional elements to prevent vertical movement of the actuator plates 26 during injection and curing of insulating foam, since standard hydraulic or pneumatic cylinders or screw joints employed as the actuator are sufficient to resist the minimized vertical force of the actuator plates associated with the horizontal alignment of the connecting rods.

Upon downward translation of the actuator plates 26a and 26b from the position shown in FIG. 3, the side and center tooling panels 12 and 16 are advanced outward more rapidly than the corner tooling panels 14. This result may be seen by comparing FIG. 4 with FIG. 5. That is, downward translation of the actuator plates 26 induces the simultaneous outward advancement of each of the side 12, center 16, and corner 14 tooling panels, however the side 12 and center 16 tooling panels are advanced rapidly in relation to the corner tooling panels 14.

Operation of the plug will now be described through one cycle of operation. Initially, the plug 10 hangs from the support rods 22 in its collapsed position, as seen in FIG. 3. Upon registration of a cabinet beneath the plug 10, the cabinet is raised until the plug 10, in its collapsed position, is fully inserted into the cabinet interior, with the bottom tooling panel 18 abutting the bottom wall of the cabinet interior. The abutment of the bottom tooling panel 18 against the bottom wall of the cabinet interior provides the requisite support to that surface during injection and curing of foam insulation to prevent bulging thereof. The bottom tooling panel 18 is shown in the illustrated embodiment of FIGS. 1 and 2 as having a curved or displaced portion; however, flat or other configurations of the bottom tooling panel are equally well suited for carrying out the present invention, dependent upon the configuration of the cabinet interior to be supported.

The bottom tooling panel 18 is maintained flush against the bottom wall of the cabinet interior by the support rods 22 as the side 12, center 16, and corner 14 tooling panels are extended. Thus, the lower pneumatic cylinder 40b is actuated which causes the lower reciprocating piston 33b to exert a downward force on the lower actuator plate 26b, thereby causing the upper and lower actuator plates 26a and 26b, interconnected by vertical tie rods 27, to translate downward along the support rods 22. As explained in detail above, the downward vertical translation of the actuator plates 26a and 26b results in the outward extension of each of the tooling panels 12, 14 and 16. As also discussed above, downward vertical translation of the actuator plates 26a and 26b is terminated upon the connecting rods 28 attaining a horizontal orientation, at which time the plurality of tooling panels 12, 14 and 16 define a substantially continuous outer surface which is complementary to, and abuts, the configuration of the inner wall of the cabinet to provide lateral support thereto during insulation injection and curing. The actuator plates 26a and 26b are maintained at this height relative to the frame 30 and, accordingly, the tooling panels 12, 14 and 16 are maintained abutting and supporting the inner wall surfaces of the cabinet, throughout the injection and curing of insulating material in the region between the inner and outer walls of the cabinet.

Upon completion of the insulating process, the plug 10 is collapsed and the tooling panels 12, 14 and 16 retracted away from the inner wall surfaces of the cabinet. This is achieved by actuating the upper pneumatic cylinder 40a which causes the upper reciprocating piston 33a to exert an upward force to the upper actuator plates 26a and 26b, thereby causing the upper and lower actuator plates 26a and 26b, interconnected by vertical tie rods 27, to translate upward along the support rods 22. As explained in detail above, the upward vertical translation of the actuator plates 26a and 26b results in the inward retraction of each of the tooling panels 12, 14 and 16, away from the inner wall of the cabinet. Upward vertical translation of the actuator plates 26a and 26b is terminated upon the tooling panels 12, 14 and 16 being sufficiently retracted to preclude contact of any of the tooling panels with the cabinet interior surfaces upon removal of the plug 10 from the cabinet interior.

After the actuator plates 26a and 26b have been sufficiently raised, and the tooling panels thus sufficiently retracted, the cabinet is then lowered away from the plug 10. After the cabinet has been completely removed from the plug 10, the newly insulated cabinet is moved away and the next cabinet to be insulated is brought into registration with the plug 10. This method is repeated to provide lateral shoring support to the interior cabinet surfaces during insulation of each of a plurality of cabinets sequentially brought into registration with the plug 10. Accordingly, a plurality of appliance cabinets may be sequentially transported into registration beneath plugs constructed in accordance with the present invention and their interiors thereafter supported by the plug during insulation operations to allow for high speed production of insulated cabinets. For instance, a feedback and control type arrangement may be employed to coordinate transportation and elevation of the cabinets with elevation and actuation of the plug 10. The tooling panels or plates 12, 14, 16 and 18 are interchangeable upon their respective subpanels 12a, 14a, 16a and 18a as desired dependent upon the shape of the inner cabinet walls, and the method delineated above is followed regardless of which set of tooling panels is being employed. This allows for rapid changeover between runs of differing cabinets.

It is desirable to provide means for independently adjusting the length of the various connecting rods 28 so that, by extending some connecting rods and/or retracting others, the synchronization of movements of the subpanels 12a, 14a and 16a in relation to one another may be varied. Likewise, it is also desirable to provide for adjustments in the spacing between each retractile subpanel 12a, 14a and 16a and its respective tooling panel 12, 14 and 16 so that when a connecting rod 28 is lengthened or shortened, the overall size of the outer surface defined by the plug 10 in its expanded position may be maintained by simply increasing or reducing the distance between the tooling panels and subpanels an amount sufficient to compensate for the change in connecting rod lengths.

While the invention has been described with reference to a preferred embodiment, it will be understood to those skilled in the art that various changes may be made and equivalents may be substituted for elements thereof without departing from the scope of the invention. In addition, many modifications may be made to adapt a particular situation or material to the teachings of the invention without departing from the essential scope thereof. For instance, other actuation means may be employed to effect the sequential panel movements, and other shapes of cabinets may be supported without deviating from the essential scope of the invention. Therefore, it is intended that the invention not be limited to the particular embodiment disclosed as the best mode contemplated for carrying out this invention, but that the invention will include all embodiments falling within the scope of the appended claims.

What is claimed is:

1. A plug for supporting the interior surfaces of a cabinet having lateral and transverse interior side surfaces during injection molding of an insulating material, comprising:
   a frame;
   a plurality of shoring panels including side panels, center panels and corner panels retractably mounted on said frame and moveable between an extended position in which the shoring panels define a substantially continuous outer surface which abuts the cabinet interior surfaces and a retracted position in which the shoring panels are withdrawn from the cabinet interior surfaces;
   said side center panels being mounted on said frame for rectilinear movement toward and away from said interior side surfaces, said corner panels being mounted on said frame for curvilinear movement toward and away from the corners formed by said interior side surfaces intersecting; and
   actuator means for extending and retracting said shoring panels in a predetermined sequence including sliding said corner panels outward in a transverse direction to abut the transverse sides of the cabinet interior and sliding said corner panels inward in the transverse direction to distance said corner panels from said transverse sides, said corner panels being extended during injection molding of insulating material to provide shoring support to the interior surfaces of the cabinet and retracted during insertion and removal of the plug within the cabinet interior to preclude the shoring panels from contacting the cabinet interior surfaces during said insertion and removal of the plug.

2. An apparatus in accordance with claim 1 in which the shoring panels have tooling panels with surfaces complementary to the interior surfaces of an appliance cabinet, said tooling panels being removably mountable upon said shoring panels and interchangeable thereupon to suit a given application, said tooling panels being interposed between said shoring panels and cabinet interior surfaces so that said tooling panels define a substantially continuous outer surface to abut and provide lateral support to said cabinet interior surfaces when said shoring panels are extended.

3. An apparatus in accordance with claim 1 wherein said actuator means includes at least one common translating member to which each of said shoring panels are pivotally connected.

4. An apparatus in accordance with claim 3 in which connecting rods extend between each of said shoring panels and said common translating member, and connect the same, the relative rate of retraction and extension of the panels in relation to one another being inversely proportional to the length of the connecting rods.

5. An apparatus in accordance with claim 4 wherein said side panels and center panels are retracted and extended more rapidly than are said corner panels.

6. An apparatus in accordance with claim 1 wherein said corner panels are slidably mounted on a retractile corner panel support frame, said corner panels being slidable thereupon between an extended position in which said corner shoring panels abut the corner sections of a cabinet interior during said injection molding of insulating material to provide shoring support to the interior surfaces of the cabinet, and a retracted position in which said corner panels are moved away from the cabinet interior surfaces.

7. An apparatus in accordance with claim 6 wherein said retractile corner panel support frame is mounted for movement in a direction normal to the direction of slidable movement of said corner panel with respect to said corner panel support frame when said corner panels move between said extended position and said retracted position.

8. An apparatus in accordance with claim 6 wherein said actuator means includes at least one translating member which is interconnected to said side and center panels by connecting rods, each connecting rod being pivotally connected at one end to said translating member and at another end to one of said side or center panels;
   said retractile corner panel support frame being connected to said translating member by connecting rods which are pivotally connected at one end to said translating member and at another end to said retractile corner panel support frame; and
   link means pivotally connecting each said corner panel to one of said center panels whereby extension and retraction of said center panels moves said corner panels outwardly and inwardly.

9. An apparatus in accordance with claim 8 wherein said retractile corner panel support frame moves said corner panels supported thereon in a direction normal to said lateral side surfaces and corner panels slide on said retractile corner panel supports in a direction parallel to the plane of said lateral side surfaces.

10. An apparatus in accordance with claim 1 wherein a plurality of separate actuator means are utilized to effect said extension and retraction movements of said panels.

11. An apparatus in accordance with claim 1 wherein the gap between adjacent panels in their extended positions is 0.1 inch or less.

12. An apparatus for supporting the internal walls of a cabinet having internal and external walls during injection and curing of insulating foam into the cavity between said internal and external walls, said internal walls including a bottom surface with four depending side surfaces which include two lateral side surfaces and two transverse side surfaces, defining four corner regions at the intersection of said depending side surfaces, comprising:
- a frame;
- a bottom supporting panel mounted on said frame to prevent bulging of said bottom cabinet surface;
- two side supporting panels retractably mounted on transverse sides of said frame and movable between an extended position in which said side supporting panels abut said transverse side surfaces and a retracted position in which said side panels are withdrawn from said transverse side surfaces;
- two center supporting panels retractably mounted on lateral sides of said frame and moveable between an extended position in which said center panels abut said lateral side surfaces and retracted position in which said center panels are withdrawn from said lateral side surfaces;
- two corner panel support frames retractably mounted on lateral sides of said frame and moveable between extended and retracted positions;
- four corner support panels, two corner support panels slidably mounted on each of said two corner panel support frames, each of said corner support panels abutting said cabinet interior lateral side surfaces upon said corner panel support frames reaching said extended positions, and said corner support panels being slidable on said corner panel support frames between outward and inward positions, said corner support panels abutting said cabinet interior transverse sides when in their outward positions and withdrawn from said transverse sides when in their retracted positions, said corner support panels abutting said interior corner regions when said corner panel support frames are extended and said corner support panels are slid outward; and
- actuator means for actuating each of said side, center and corner supporting panels in a predetermined sequence between said retracted and extended positions, and further actuating said corner supporting panels in said predetermined sequence between inward and outward positions, said side, center, and corner supporting panels forming a generally continuous outer configuration when in their extended and outward positions which abuts the complementary internal walls of a cabinet
- at least one of said side supporting panels and said corner panel support frames being movable arcuately between a retracted and an extended position.

13. An apparatus in accordance with claim 11 wherein said corner support panels being movable along a curved path between said retracted and extended positions in response to said actuator means moving said corner panel support frames and sliding said corner support panels with respect to said corner panel support frames.

14. An apparatus in accordance with claim 12 wherein said supporting panels include interchangeable tooling panels detachably mounted thereto, which tooling panels have surface configurations complementary to said cabinet interior configuration whereby said tooling panels are interposed between said support panels and cabinet interior configuration such that said tooling panels define a substantially continuous outer surface which abuts said complementary cabinet interior configuration when said support panels are in their extended positions.

15. An apparatus in accordance with claim 12 wherein said actuator means includes at least one common translating member to which each of said support panels are pivotally connected.

16. An apparatus in accordance with claim 15 in which said pivotal connection comprises connecting rods extending between each of said support panels and said common translating member, whereby the relative rate of retraction and extension of the panels in relation to one another is inversely proportional to the length of the connecting rods extending thereto.

17. An apparatus in accordance with claim 15 wherein said side and center supporting panels are retracted and extended rapidly in relation to said corner supporting panels.

18. An apparatus in accordance with claim 12 wherein said apparatus includes an elevating means which raises the cabinets to bring the panels within the cabinet interior and lowers the cabinets to remove the panels from the cabinet interior.

19. An apparatus in accordance with claim 12 wherein said frame is attached to an elevating means which lowers the apparatus into a cabinet interior and removes the apparatus therefrom at the completion of the curing operation.

20. An apparatus in accordance with claim 19 wherein a feedback and control system is employed to automatically raise and lower the cabinets to bring each of a plurality of plugs successively into registration therein, and automatically trigger the actuator to extend and retract the supporting panels in a predetermined sequence.

21. An apparatus in accordance with claim 12 wherein a plurality of separate actuator means are utilized to effect said extension and retraction movements of said panels.

22. An apparatus in accordance with claim 12 wherein the gap between adjacent supporting panels in their extended positions is 0.1 inch or less.

* * * * *